United States Patent
Cao et al.

(10) Patent No.: US 10,248,355 B2
(45) Date of Patent: Apr. 2, 2019

(54) DATA MIGRATION FOR APPLICATIONS ON A MOBILE DEVICE

(71) Applicant: International Business Machines Corporation, Armonk, NY (US)

(72) Inventors: Kai Yao Cao, Shanghai (CN); Ming Qiao Shang Guan, Beijing (CN); Hui Wang, Beijing (CN); Ying-Chen Yu, Taipei (TW); Jia Wei Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 15/438,994

(22) Filed: Feb. 22, 2017

(65) Prior Publication Data

US 2018/0239555 A1 Aug. 23, 2018

(51) Int. Cl.
| | |
|---|---|
| *G06F 12/02* | (2006.01) |
| *G06F 3/06* | (2006.01) |
| *G06F 17/30* | (2006.01) |
| *H04L 29/08* | (2006.01) |
| *H04W 4/38* | (2018.01) |

(52) U.S. Cl.
CPC ........... *G06F 3/0647* (2013.01); *G06F 3/067* (2013.01); *G06F 3/0608* (2013.01);
(Continued)

(58) Field of Classification Search
CPC ............. G06F 17/30067; G06F 17/303; G06F 3/0608; G06F 3/0622; G06F 3/0647; G06F 3/067

See application file for complete search history.

(56) References Cited

U.S. PATENT DOCUMENTS

| 9,462,022 B2 | 10/2016 | Chan et al. |
| 2008/0168245 A1 | 7/2008 | De Atley et al. |

(Continued)

FOREIGN PATENT DOCUMENTS

| CN | 104156236 A | 11/2014 |
| CN | 105516281 A | 4/2016 |
| CN | 105700827 A | 6/2016 |

OTHER PUBLICATIONS

Cao, et al., "Data Migration for Applications on a Mobile Device," U.S. Appl. No. 15/668,056, filed Aug. 3, 2017.
(Continued)

*Primary Examiner* — Yong J Choe
(74) *Attorney, Agent, or Firm* — Peter J. Edwards

(57) ABSTRACT

In various embodiments, a computer-implemented method includes identifying computer software applications (applications) on a mobile device. The method may also include generating migration profiles for the applications, where each application corresponds (corresponding application) to a migration profile and where the migration profile includes data files about the corresponding application. The method may also include monitoring storage space of the applications on the mobile device, where the monitoring includes identifying data files of the applications. The method may also include calculating an amount of storage space to determine whether there is a shortage of storage space for the data files. The method may also include, in response to calculating that there is a shortage of storage space, determining when the data files will be migrated. The method may also include, in response to determining when the data files will be migrated, migrating the data files to external storage.

20 Claims, 15 Drawing Sheets

(52) U.S. Cl.
CPC .......... *G06F 3/0622* (2013.01); *G06F 17/303* (2013.01); *G06F 17/30067* (2013.01); *H04L 67/1097* (2013.01); *H04L 67/306* (2013.01); *H04L 67/2814* (2013.01); *H04W 4/38* (2018.02)

(56) References Cited

U.S. PATENT DOCUMENTS

| | | |
|---|---|---|
| 2009/0088142 A1 | 4/2009 | Baribault et al. |
| 2011/0016089 A1 | 1/2011 | Freedman et al. |
| 2011/0087976 A1 | 4/2011 | Cisler et al. |
| 2012/0117558 A1 | 5/2012 | Futty et al. |
| 2014/0201655 A1 | 7/2014 | Mahaffey et al. |
| 2016/0162271 A1 | 6/2016 | Zhi et al. |

OTHER PUBLICATIONS

List of IBM Patents or Patent Applications Treated as Related, Dated Jul. 28, 2017, 2 pages.

Amadeo, "Android 6.0 has a great auto backup system that no one using (yet)", Gears & Gagets, Oct. 12, 2015, printed Oct. 20, 2016, 10 pages.

Unknown, "Cloud Machine Learning Platform", Google Cloud Platform, Google Cloud Machine Learning at Scale, printed Nov. 22, 2016, 29 pages, https://cloud.google.com/products/machine-learning/.

Unknown, "What is Amazon Machine Learning," Amazon Web Services, printed on Nov. 22, 2016, 1 page, © 2016, Amazon Web Services, Inc. or its affiliates, http://docs.aws.amazon.com/machine-learning/latest/dg/what-is-amazon-machine-learning.html.

Unknown, "Azure Machine Learning Dcoumentationl", Microsoft Azure, printed Nov. 22, 2016, 1 page, https://docs.microsoft.com/en-us/azure/machine-learning/.

Mell et al., "The NIST Definition of Cloud Computing," Recommendations of the National Institute of Standards and Technology, U.S. Department of Commerce, Special Publication 800-145, Sep. 2011, 7 pages.

IBM, "Getting started with Watson Developer Cloud and Bluemix," printed Feb. 21, 2017, 3 pages, http://www.ibm.com/watson/developercloud/doc/getting_started/.

DATA MIGRATION FOR APPLICATIONS ON A MOBILE DEVICE

BACKGROUND

The present disclosure relates to data migration, and more specifically to the migration of data between a mobile device and external storage.

SUMMARY

The present invention provides a computer-implemented method, system, and computer program product to migrate data files from a mobile application to external storage. The method may include identifying one or more computer software applications (applications) on a mobile device. The method may also include generating one or more migration profiles for the one or more applications, where each of the one or more applications corresponds (corresponding application) to a migration profile among the one or more migration profiles and where the migration profile includes data about the corresponding application. The method may also include monitoring storage space of the one or more applications on the mobile device, where the monitoring includes identifying data files of the one or more applications. The method may also include calculating an amount of storage space to determine whether there is a shortage of the storage space on the mobile device for the data files of the one or more applications. The method may also include, in response to calculating that there is a shortage of the storage space, determining when the data files of the one or more applications will be migrated. The method may also include, in response to determining when the data files of the one or more applications will be migrated, migrating the data files of the one or more applications to external storage.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
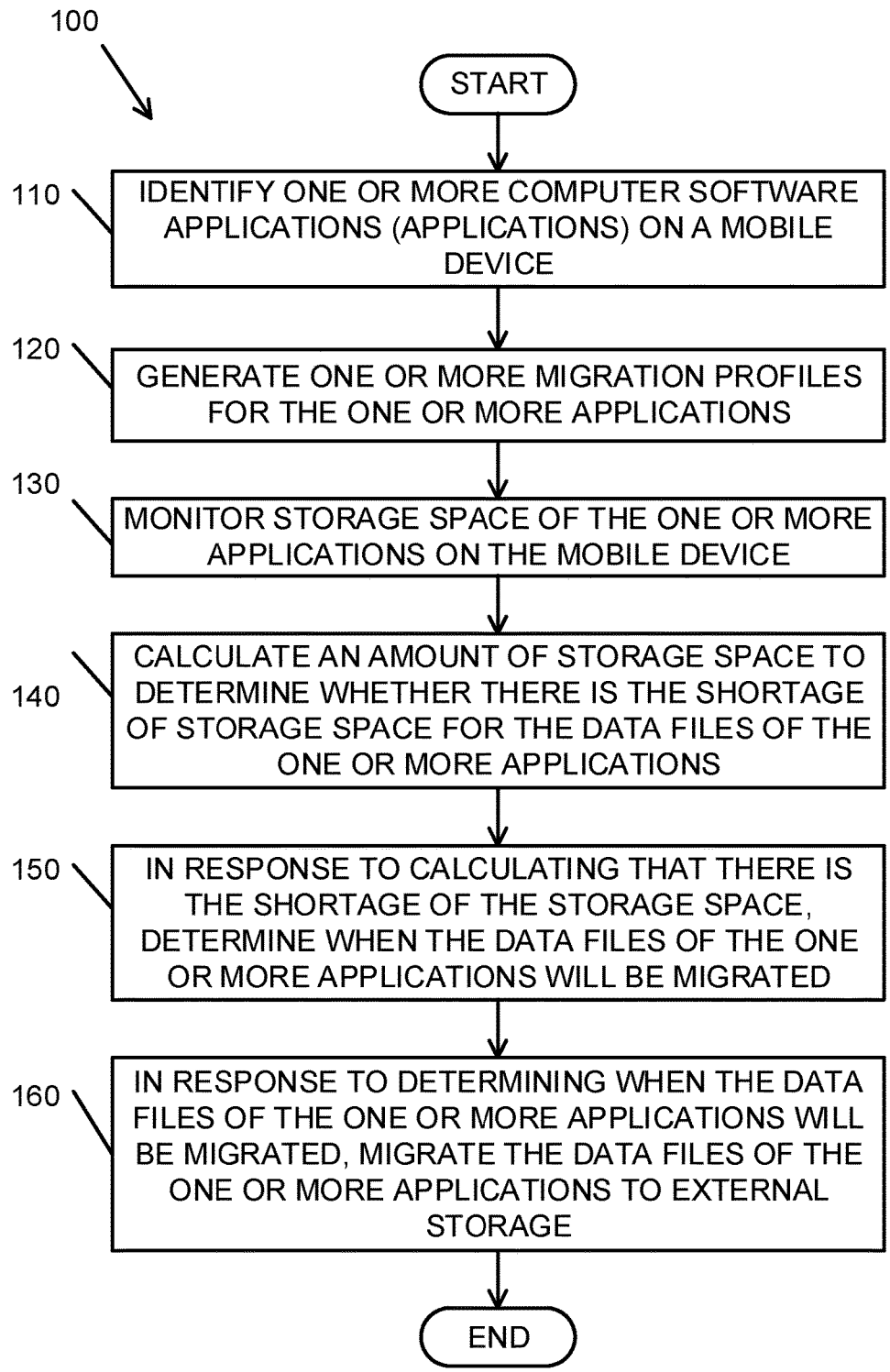
FIG. 1 presents a flowchart, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to data migration, and more specifically to migrating data of a mobile application between a mobile device and external storage. While the present disclosure is not necessarily limited to such applications, various aspects of the disclosure may be appreciated through a discussion of various examples using this context.

The present invention provides a computer-implemented method, system, and computer program product to migrate data files from a mobile device to external storage and to recall data files from external storage back to the mobile device. Data files may be referred to as data. In recent years, the technologies and capabilities of mobile devices have steadily increased. These technologies and capabilities have resulted in an increase in the need of storage space. Mobile applications, for example, have increased in recent years. By increasing the amount of mobile applications on a mobile device, the amount of data stored on the mobile device increases, causing a need for additional storage space on the mobile device.

Aspects of the present disclosure are directed toward using profiles (hereinafter migration profile(s)) of mobile applications (hereinafter application(s)) to assist in migrating data. Migration profiles, as discussed herein, assist in the data migration process. Migration profiles may contain migration rules, where migration rules outline specific conditions and information to assist in determining if and when to migrate data.

By migrating data to external storage, additional storage becomes available on the mobile device. Activity on the mobile device may be monitored, in order to help determine which data needs to be migrated. By monitoring activity, primarily user activity, a computer system can determine how frequently data files and mobile applications are used on the mobile device. For example, a user may use a weather application once a day but the same user may use a photograph application an average of once every hour. Because the weather application is used significantly less than a photograph application on a specific mobile device, the data for the weather application may be selected to be migrated to external storage.

In various embodiments, the data migration is automatic. An automatic migration allows data to be migrated to external storage without any user involvement. For instance, the photograph application may run out of storage space on a mobile device. Instead of a user having to remove photograph data from the mobile device, the photograph data may be automatically migrated using a computer system. Using automatic migration allows for storage on a mobile device to be greatly enhanced in a more intelligent way without reducing user experience.

In various embodiments, the data migration is only a partial migration. Instead of having to migrate all data relating to an application, only select data may have to be migrated. For example, using the same photograph application discussed above, only select photograph data is migrated to external storage, instead of migrating all photographs (photograph data).

Additional aspects of the present disclosure are directed towards using a prediction engine to recall data to a mobile device from external storage. Once data is migrated from the mobile device to external storage, it will eventually be recalled, or migrated from external storage back to the mobile device. In various embodiments, this recall migration is done prior to a user accessing the application and its corresponding data on the mobile device (pre-fetch recall). Recalling data before user access allows for a minimal amount of user inconvenience. This pre-fetch recall method is based on data file access levels, and user habit prediction result. The recall will be triggered when a computer system detects a migrated file is about to be accessed on the mobile device, and will recall the file before a user's actual accessing in order to reduce user waiting time and enhance user experience. This detection is done using a prediction engine. By using a prediction engine, user habit learning and prediction are incorporated to help improve migration.

In various embodiments, the data migration, or recall, is automatic. This allows for data to be migrated from the mobile device and recalled back to the mobile device without any user involvement.

In various embodiments, both the data migration and recall operate at an operating system (OS) level, monitoring the storage space of a mobile device as well as the occupied space and use frequency of each application.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources by may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a flowchart illustrating a method 100 for migrating data to external storage is depicted, according to various embodiments. In an embodiment, the method 100 is implemented on a computer system such as computer system 300. In an embodiment, the method 100 is implemented on a computer system such as computer system 1500. In an embodiment, a computer system is configured to execute operation 110 to identify one or more computer software applications (hereinafter mobile applications or applications) on a mobile device. In various embodiments, examples of mobile devices include cellular telephones (e.g., smartphones), tablet computers, smartwatches, laptops, personal digital assistants (PDAs), handheld gaming consoles, portable media players (PMPs), digital cameras, and digital media players (DMPs). In various embodiments, identifying applications includes at least registering basic information of an application into a computer system. An application may send its data to a computer system when the application is first installed on a mobile device. In various embodiments, identifying applications includes at least locating an application on a mobile device. In an embodiment, a computer system is configured to execute operation 120 to generate one or more migration profiles for the one or more applications. In various embodiments, each of the one or more applications corresponds (corresponding application) to a migration profile among the one or more migration profiles and the migration profile includes data about the corresponding application. In various embodiments, each of the one or more migration profiles includes a migration rule. In an embodiment, the migration rule includes data describing one or more conditions under which the data files of the one or more applications are able to be migrated. In various embodiments, each migration profile corresponds with an application. In various embodiments, the migration profile includes data about its corresponding application. In an embodiment, a migration profile includes a migration rule, where the migration rule includes at least data describing conditions under which data files of the one or more applications are able to be migrated. For example, a migration rule may include a value, where the value indicates a quantity of data that once reached triggers a migration of data for the application.

In an embodiment, a migration profile includes a migration level, where the migration level helps determine an order of migration for data files needing to be migrated. In various embodiments, the migration level is determined by its corresponding application. In various embodiments, the migration level is determined by a computer system. In various embodiments, the migration level is determined by a user of a mobile device. The contents of a migration profile are further outlined in FIG. 5.

In an embodiment, a computer system is configured to execute operation 130 to monitor storage space of the one or more applications on the mobile device. In various embodiments, storage space is an amount of memory available to data on a mobile device. In an embodiment, monitoring storage space includes identifying data files of the one or more applications. Identifying data files may include locating the data in a memory of a mobile device. In various embodiments, monitoring storage space includes communicating with a memory of a mobile device. Communicating with a memory may include identifying data of an application in a memory of a mobile device and periodically surveying the amount of storage space available to the data and the amount of storage space being used by the data of an application. In various embodiments, monitoring storage space includes updating records of a computer system. For example, if storage space is monitored and it is determined that there is 10 gigabytes (GB) of storage space available to data of a mobile application, the computer system may then update its records to document the current quantity of storage space available.

In various embodiments, monitoring storage space additionally includes monitoring application activity on a mobile device. Monitoring application activity may include monitoring user activity and user frequency of mobile applications. In various embodiments, application activity determines the order of migration of data files. In an embodiment, application activity is considered when determining a migration level for the migration profile.

In an embodiment, a computer system is configured to execute operation 140 to calculate an amount of storage space to determine whether there is a shortage of the storage space on the mobile device for the data files of the one or more applications. A shortage of storage space may occur when the amount of memory allocated for data of an application is less than the amount of memory necessary for the data of an application. For example, a mobile application may require 500 megabytes (MB) of storage space, but a memory may only have allotted 400 MB of storage space for the specific application.

In various embodiments, calculating the amount of storage space to determine whether there is a shortage of storage space includes accessing a threshold value for each of the one or more applications, calculating, based on the monitoring of the storage space of the one or more applications, an engaged value for each of the one or more applications, and comparing the engaged value with the threshold value for each of the one or more applications to determine whether there is the shortage of the storage space. In various embodiments, the threshold value is included in the migration profile. In various embodiments, the threshold value is a designated amount of the storage space for the corresponding application. In various embodiments, the engaged value is an amount of the storage space currently being used, or engaged, by the corresponding application. In various embodiments, the engaged value can be calculated by subtracting a free space value from the threshold value, where the free space value is an amount of storage space still available for the corresponding application. In various embodiments, the threshold value is determined by its corresponding mobile application. In various embodiments, the threshold value is determined by a user of a mobile device. In various embodiments, the threshold value is determined by a computer system.

In various embodiments, calculating the amount of storage space to determine whether there is a shortage of storage space further includes, determining that the engaged value is greater than the threshold value, indicating that there is the shortage of the storage space, and transmitting a storage shortage alert to trigger the migration of the data files of the one or more applications to external storage. Alternatively, in various embodiments, it may be determined that the engaged value is less than the threshold value, indicating that there is not a shortage of storage space.

For example, a mobile application may be allotted 600 MB of storage space in a memory. In this example, the threshold value is 600 MB. Continuing the example, the mobile device may currently require, or request to use, 500 MB of storage space in a memory. In this example, the engaged value is 500 MB. To determine whether there is a shortage of storage space, the threshold value of 600 MB is compared to the engaged value of 500 MB. In this example, the engaged value is less than the threshold value, indicating that there is available storage space, therefore there is not a shortage of storage space.

In another example, a mobile application may again be allotted 600 MB of storage space in a memory. Again, like the previous example, the threshold value is 600 MB. In this example, the mobile device may currently require 800 MB of storage space in a memory, therefore the engaged value is 800 MB. Comparing the engaged value to the threshold value, 800 MB to 600 MB respectively, the engaged value is greater than the threshold value indicating a shortage of storage space.

In various embodiments, calculating the amount of storage space to determine whether there is the shortage of the storage space includes accessing a threshold percentage value for each of the one or more applications, calculating, based on the monitoring of the storage space of the one or more applications, an engaged percentage value for each of the one or more applications, and comparing the engaged percentage value with the threshold percentage value for each of the one or more applications to determine whether there is the shortage of the storage space. In an embodiment, the threshold percentage value is included in the migration profile. In various embodiments, the threshold percentage value indicates a designated percentage of the storage space for the corresponding application. In various embodiments, the engaged percentage value indicates a percentage of the storage space currently being used, or engaged, by the corresponding application. In various embodiments, the threshold percentage value is determined by its corresponding mobile application. In various embodiments, the threshold percentage value is determined by a user of a mobile device. In various embodiments, the threshold percentage value is determined by a computer system.

In various embodiments, the engaged percentage value may be less than the threshold percentage value, indicating that there is not a shortage of storage space. In various embodiments, the engaged percentage value may be greater than the threshold percentage value, indicating that there is a shortage of storage space. In an embodiment, when it is determined that there is a shortage of storage space, a storage shortage alert may be transmitted to trigger the migration of the data files of the one or more applications to external storage.

For example, a mobile device may have 8 GB of storage space. A mobile application may be allotted, or designated, 2% of the total storage space of a mobile device. In this example, the threshold percentage value is 2%. Continuing this example, a mobile application may require, or request to use, 4% of the total storage space of an application. The engaged percentage value, in this example, is 4%. Comparing the engaged percentage value to the threshold percentage value, 4% and 2% respectively, the engaged percentage value is greater than the threshold percentage value, indicating a shortage of storage space for the specific mobile application.

In an embodiment, a computer system is configured to execute operation 150 to, in response to calculating that there is a shortage of the storage space, determine when the data files of the one or more applications will be migrated. In various embodiments, determining when the data files of the one or more applications will be migrated includes determining a time of migration for the data. For example, it may be determined that the migration of data may occur at 1:00 AM, as to not disrupt a user of a mobile device.

In various embodiments, determining when the data files of the one or more applications will be migrated includes determining a date of migration for the data. In various embodiments, the date is a recurring date. For example, it may be determined that the migration of data may occur on the $1^{st}$ day of every month. In various embodiments, the date is a one-time date. For example, it may be determined that the migration of data may occur on Jan. 31, 2017.

In various embodiments, determining when the data files of the one or more applications will be migrated includes determining a circumstance of migration for the data. A circumstance may include a battery percentage of the mobile device, a quantity or size of storage for an application, a percentage of storage for an application, an amount of storage shortage for an application, a percent of storage shortage for an application, a condition set in the migration profile, or other various factors or events.

In an embodiment, a computer system is configured to execute operation 160 to, in response to determining when the data files of the one or more applications will be migrated, migrate the data files of the one or more applications to external storage. In various embodiments, migrating data to external storage includes relocating the data from the mobile device to external storage. In an embodiment, migrating the data files of the one or more applications to the external storage includes migrating the data files from the mobile device to cloud storage. In various embodiments, external storage includes at least cloud storage, memory cards, memory sticks, external hard disk drives, compact discs (CDs), and/or flash memory. In various embodiments, a mobile application is continuously displayed on a mobile device after the data is migrated to external storage. In this embodiment, application icons may not be deleted from a mobile device even after a highest level migration.

In various embodiments, migrating the data files of the one or more applications to the external storage is an automatic migration. Automatic migration allows for data to be migrated to external storage without any user involvement, where a user is a user of a mobile device. In various embodiments, the migrating and the automatic migration includes monitoring the one or more applications for satisfaction of the conditions of the migration rule, determining whether the one or more applications satisfies the migration rule, and, in response to determining that the one or more applications satisfies the migration rule, automatically migrating the data files of the one or more applications to the external storage.

In various embodiments, only a portion of the data files of the one or more applications is migrated. For example, it may have been determined that an application has a shortage of storage space and thus the corresponding data needs to be migrated. In this example, only a partial amount (e.g. 50 MB out of 500 MB) will be migrated to external storage. In various embodiments, a portion of data includes an amount (e.g. size) of data. In various embodiments, a portion of data includes a percentage of data.

In various embodiments, each of the one or more migration profiles includes a migration level. In various embodiments, the migration level includes data to be used to identify the portion of data files to migrate to the external storage. In an embodiment, the migration level is determined by the corresponding application. In various embodiments, data is migrated in order of migration level. For example, data may be migrated starting with level 1, then level 2, then level 3, etc. until all necessary data has been migrated. Partial migration may only migrate a select few migration levels as opposed to all migration levels assigned to data of an application.

Figure 2:
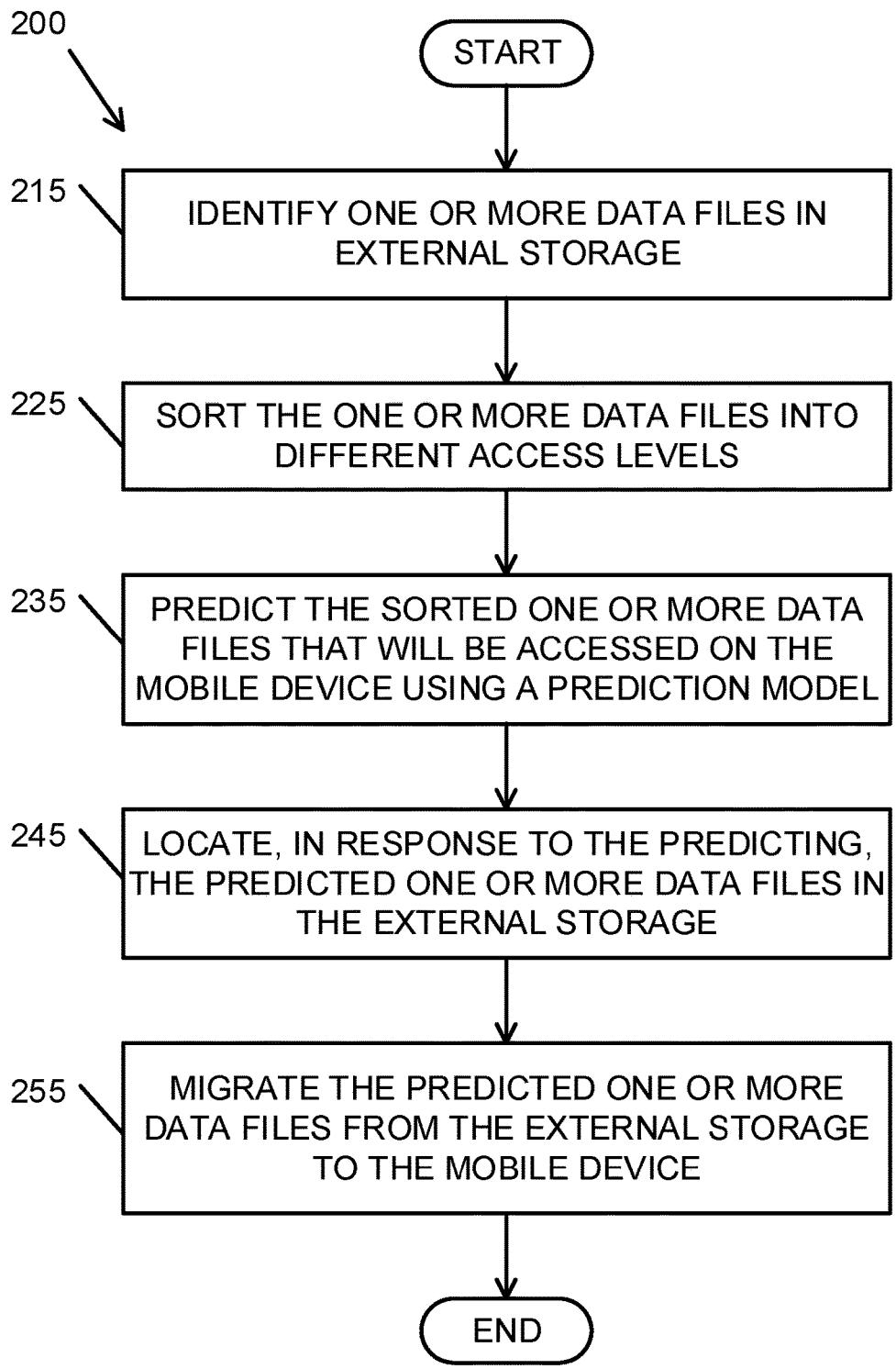
FIG. 2 presents a flowchart, according to various embodiments.

Referring to FIG. 2 a flowchart illustrating a method 200 for recalling data to a mobile device, when the data has been previously migrated to external storage (as displayed in FIG. 1), is depicted, according to various embodiments. Method 200 may additionally be referred to as pre-fetch recall herein. In various embodiments, the method 200 is implemented on a computer system such as computer system 300. The method 200 may occur subsequent to the method 100 discussed herein.

In an embodiment, a computer system is configured to execute operation 215 to identify one or more data files in external storage. In various embodiments, the one or more data files correspond to a computer software application on a mobile device. Data files may refer to at least a portion of data that corresponds to an application. In various embodiments, the one or more data files were previously stored on a mobile device. In various embodiments, identifying one or more data files in external storage includes at least determining the data files in external storage that have been previously migrated from a mobile device.

In an embodiment, a computer system is configured to execute operation 225 to sort the one or more data files into different access levels. In various embodiments, access levels designate a hierarchy, or an order, for the one or more data files. For example, level one data files may be migrated to the mobile device first, before any other data files.

In various embodiments, data files belonging to one application are divided, or sorted, into access levels based on their organization hierarchy according to their application type and development invoking relationship. An organization hierarchy may include the layout and organization of an application. For example, the data files constructing the home screen of an application may be marked as level 1, because logically and organizationally, the home screen of an application is accessed before any other portion of an application. Level 1 may contain image files, text files, instruction binary files, and library files. In this example, files that can be accessed from any interface in the home screen may be marked as level 2. The process may repeat until all data files for an application are assigned an access level.

In various embodiments, access levels of the one or more data files are determined by an access order of the one or more data files for the application. An access order may be an order that a user of a mobile device accesses data files for an application. In various embodiments, an access order is determined by monitoring user access on a mobile device. By monitoring user access, a computer system may determine a pattern or routine of a user on the mobile device. For example, after monitoring user access it is determined that a user opens a weather application every morning and then, immediately following, a user plays a game on an application. In this example, the access order starts with the weather application and continues with the game application. Thus, in this example, the data pertaining to the weather application is migrated to the mobile device first, before the data pertaining to the game application. In various embodiments, the prediction engine may be used to predict a future access order of a user in order to migrate, or recall, the data files to the mobile device before a user accesses the specific application and data files.

In various embodiments, access levels of the one or more data files are determined by a directory access order for an operating system (OS). Directory access order is the order the operating system accesses the data based on the layout of the system. In an embodiment, access levels determined by a directory access order are determined by the computer system. Data from the application may not be necessary to determine the access levels.

In various embodiments, access levels are equivalent to the migration levels discussed herein. In this embodiment, when a migration profile is generated for an application, a migration/access level is determined and included in the migration profile. The migration/access level may be determined prior to the migration of data files to external storage. In this embodiment, sorting the one or more data files into different access levels includes determining the access levels of the data files using the migration profile.

In an embodiment, a computer system is configured to execute operation 235 to predict the sorted one or more data files that will be accessed on the mobile device using a prediction engine. In various embodiments, the prediction engine gathers data of usage of the application onto the mobile device. The data may include at least one of the following, access frequency of the one or more data files of the application, access peaks of the one or more data files of the application, and access dependency of the one or more data files of the application. Access frequency is the frequency in which specific data files are being accessed. Access peaks are specific times and conditions (e.g. date, time, location, event) in which one or more data files have the highest amount of access. Access dependency is a dependency relationship between data and applications. For example, one interface of one application may call some interface of another application, thus the two applications and their corresponding data are access dependent. In various embodiments, the prediction engine uses cloud machine learning.

In the beginning, when a mobile device is being used by a user in the first prediction cycle time, the prediction engine may have less user data and may not be able to generate an accurate prediction result. In this case, the method 200 may only use the access level of each file to execute the pre-fetch migration operations. After a prediction cycle time, the prediction engine may gather enough data for user habit and prediction and from then, the prediction engine may use both access levels and prediction results to recall, or migrate, the data files.

For example, in the first prediction cycle time a user opens a game application, where the game application has multiple games to choose from. In this example, the data files for this game application are then migrated on to the mobile device in order of access level. After gathering data using the prediction engine, it may be determined that a user always accesses a specific game first, before any other games on the application. In this example, for the second prediction cycle, because it has been determined that the user opens a specific game first, all the data files for this specific game will be migrated, or recalled, to the mobile device before any other data files on the application.

In an embodiment, a computer system is configured to execute operation 245 to locate, in response to the predicting, the predicted one or more data files in the external storage. Once it has been determined which data files are being migrated, these data files are located in external storage. In various embodiments, the data files are located using a migration map on the computer system. The contents of a migration map are further outlined in FIG. 6 herein.

In an embodiment, a computer system is configured to execute operation 255 to migrate the predicted one or more data files from the external storage to the mobile device. In various embodiments, migrating data files includes transferring data files from external storage to a mobile device. In various embodiments, the migrating, or recalling, is done in order of the access levels. In various embodiments, the migrating, or recalling, is done using the results of the prediction engine. In various embodiments, external storage includes at least cloud storage.

In various embodiments, when data files with access level a are currently being accessed, the computer system will start to fetch, and migrate, data files with access level a+1. When data files with access level a+1 are currently being accessed, the computer system may fetch, and migrate, data files with access level a+2. This cycle continues until all data files up to level a+n have been fetched and migrated, where n may range from 0 to any positive integer. In various embodiments, n is set by its corresponding application. In various embodiments, n is set by a computer system. In various embodiments, n is set by a user of a mobile device. In various embodiments, n is included in the migration profile of an application.

For example, a user is currently on a home page of an application, therefore data files with access level 1 are currently being accessed. While the user is on the home page of the application, and accessing level 1 data files, level a+1 or level 2 files are being migrated onto the mobile device. In this example, the variable n has been set by the computer system to be 4 (n=4). When n=4, files will continue to be migrated until level a+n, which in this example is level 5 (1+4). Therefore, in this example, while a user is accessing level a+1 (or level 2) files, the level a+2 (or level 3) data files will be fetched and migrated. When the level 3 files are accessed by a user, level a+3 (or level 4) files will be fetched and migrated. Finally, in this example, when level 4 files are accessed by a user, level a+4 (or level 5) files will be fetched and migrated to the mobile device.

In various embodiments, migrating the predicted one or more data files from external storage to a mobile device is an automatic migration. As discussed herein, automatic migration allows for data to be migrated to external storage without any user involvement.

In various embodiments, the migrating comprises migrating the predicted one or more data files from external storage to the mobile device by individual access levels. In various embodiments, the migrating comprises migrating the predicted one or more data files from external storage to the mobile device by multiple access levels. Data files may be migrated one access level at a time or data files may be migrated by group of access levels. For example, level 2 and 3 data files may be migrated back to the mobile device at the same time.

In various embodiments, the method 200 further includes determining high priority files for each of the access levels, predicting the high priority files that will be accessed on the mobile device using the prediction engine, and migrating the predicted high priority files from external storage to the mobile device. High priority files may be highest priority files selected from the one or more data files sorted into the access levels. In various embodiments, the migrating of the predicted one or more data files is subsequent to the migrating of the high priority files. In other words, the high priority files may be migrated before the predicted data files. In various embodiments, high priority files are determined using the prediction engine.

In various embodiments, high priority files include global high priority files and access level high priority files. Global high priority files are highest priority files for the mobile device. Access level high priority files are highest priority files for each of the access levels. Global high priority files may be the data files that a user is most likely to access, regardless of access level. Access level high priority files may be the data files that a user is most likely to access on a certain access level. In various embodiments, each access level has access level high priority files.

In various embodiments, global high priority files are migrated from external storage to the mobile device, and then access level high priority files are migrated from external storage to the mobile device. In other words, the global high priority files may be migrated, or recalled, to the mobile device first, before the access level high priority files. When migrating the access level high priority files, the migrating may be done in order of the access levels. In various embodiments, for each of the access levels, the migrating of the predicted data files is subsequent to the migrating of the access level high priority files. The order of migration may be global high priority files, access level high priority files, then access level data files. As disclosed herein, the access level high priority files and the access level data files are migrated in order of access level. For example, when migrating data files for a specific application, all global high priority are migrated, regardless of access level. Then, the access level high priority files are migrated for level 1, followed by the access level data files for level 1. Once all level 1 files are migrated, in this example, the access level high priority files are migrated for level 2, followed by the access level data files for level 2. This order may continue until all necessary data files are migrated.

After training the prediction engine, when a user opens an application home screen, the computer system may query the prediction engine, and the prediction engine may use its trained model to predict which files of a specific application a user is most likely to access, both from a global scope and specific to each access level. The global high priority files may be migrated and then the computer system may continue the other recall according to files' access level and access level high priority.

Figure 3:
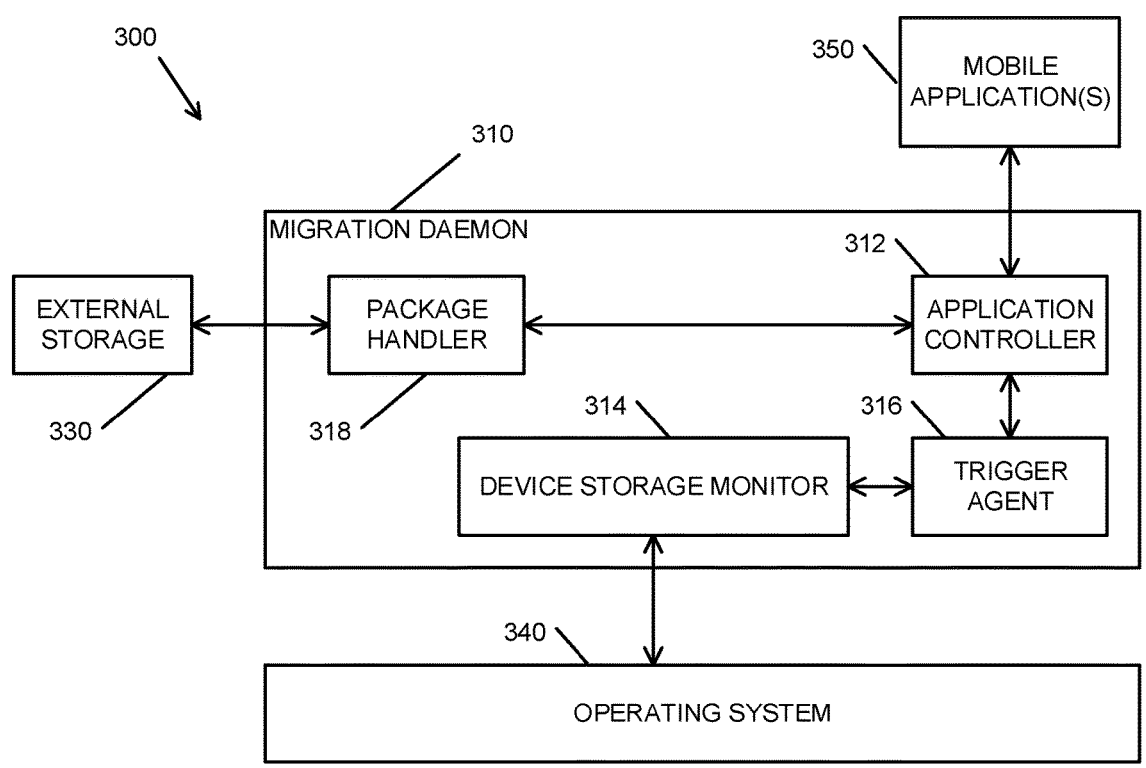
FIG. 3 depicts a schematic diagram outlining a computer system, according to various embodiments.

Referring to FIG. 3, system 300 includes a computer system for migrating and recalling data, according to various embodiments. System 300 is only one possible computer system capable of migrating and recalling data.

In various embodiments, computer system 300 includes a migration daemon 310 to manage computer software application(s) (applications) or mobile application(s) 350 on a mobile device and migrate applications 350 to an external storage 330. In various embodiments, migration daemon 310 is on a mobile device. In various embodiments, in order to work with migration daemon 310, application(s) 350 implement a migration interface. In various embodiments, migration daemon 310 includes an application controller 312, a device storage monitor 314, a trigger agent 316, and a package handler 318. In various embodiments, computer system 300 also includes external storage 330, operating system 340, and application(s) 350. In various embodiments computer system 300 includes one or more computer processors, where the one or more computer processors include migration daemon 310 for managing one or more applications on a mobile device. Although the computer system 300 is depicted herein with certain elements and implementations, the computer system 300 is not limited to these elements and implementations.

In an embodiment, application controller 312 identifies one or more applications 350 on a mobile device. In various embodiments, application controller 312 also generates one or more migration profiles for the one or more applications 350, where each of the one or more applications 350 corresponds (corresponding application) to a migration profile among the one or more migration profiles and where the migration profile includes data about the corresponding application. The application controller 312 may play a key role in uniting applications 350 with migration daemon 310. When a new application 350 is first installed on a mobile device, application 350 may register its basic info along with migration rules into application controller 312. In various embodiments, application controller 312 performs space and use frequency inspection of each application 350 requested by the trigger agent 316 and receives notifications from the trigger agent 316 when an application is selected to be migrated. Application controller 312 may also pass migration information to its corresponding application 350. In various embodiments, application controller 312 delivers different data, or data packages, sent by applications 350 and passes them to package handler 318.

In an embodiment, device storage monitor 314 monitors storage space of the one or more applications 350 on the mobile device, where the monitoring includes identifying data files of the one or more applications 350. In various embodiments, device storage monitor 314 calculates an amount of storage space to determine whether there is a shortage of the storage space on the mobile device for the data files of the one or more applications 350. In various embodiments, the device storage monitor 314 also accesses a threshold value for each of the one or more applications 350, calculates, based on the monitoring of the storage space of the one or more applications 350, an engaged value for each of the one or more applications 350, and compares the engaged value with the threshold value for each of the one or more applications 350 to determine whether there is the shortage of the storage space. In various embodiments, the threshold value is a designated amount of the storage space for the corresponding application. In an embodiment, the threshold value is included in the migration profile. In various embodiments, the engaged value is an amount of the storage space currently being used by the corresponding application.

In various embodiments, the device storage monitor 314 also accesses a threshold percentage value for each of the one or more applications 350, calculates, based on the monitoring of the storage space of the one or more applications 350, an engaged percentage value for each of the one or more applications 350, and compares the engaged percentage value with the threshold percentage value for each of the one or more applications 350 to determine whether there is the shortage of the storage space. In various embodiments, the threshold percentage value indicates a designated percentage of storage space for the corresponding application. In an embodiment, the threshold percentage value is included in the migration profile. In various embodiments, the engaged percentage value indicates a percentage of the storage space currently being used by the corresponding application.

In various embodiments, the device storage monitor 314 monitors storage space of a mobile device periodically. The device storage monitor 314 may communicate with a memory, or native memory API, served by an operating system 340. In various embodiments, when it has been determined that there is a shortage of storage space, the device storage monitor 314 transmits a storage shortage alert to the trigger agent 316.

In an embodiment, a trigger agent 316, in response to calculating that there is the shortage of storage space, determines when the data of the one or more applications 350 will be migrated. In various embodiments, trigger agent 316 listens to the disk or memory storage shortage alert sent by the device storage monitor 314 and triggers a space and use frequency inspection of each application automatically and periodically from the application controller 312. The trigger agent 316 may also decide when and which data needs to migrate based on the input from both the device storage monitor 314 and application controller 312, and then notifies application controller 312 about the chosen data.

In an embodiment, a package handler 318, in response to determining when the data files of the one or more applications will be migrated, migrates the data files of the one or more applications 350 to external storage 330. In various embodiments, package handler 318 migrates the data files of the one or more applications 350 to external storage 330 as an automatic migration. In various embodiments, a package handler 318 migrates data files from external storage 330 to a mobile device. In various embodiments, a package handler 318 is the middleware to migrate application data to external storage 330, or recall application data back to a mobile device from external storage 330. The package handler 318 may receive migration file lists of each application 350 from the application controller 312. After receiving the list, the package handler 318 may maintain a package location database to record an allocation map (migration map) between the application data and external storage 330. A migration map is further outlined in FIG. 6. The contents of a package handler 318 are further outlined in FIG. 4.

Figure 4:
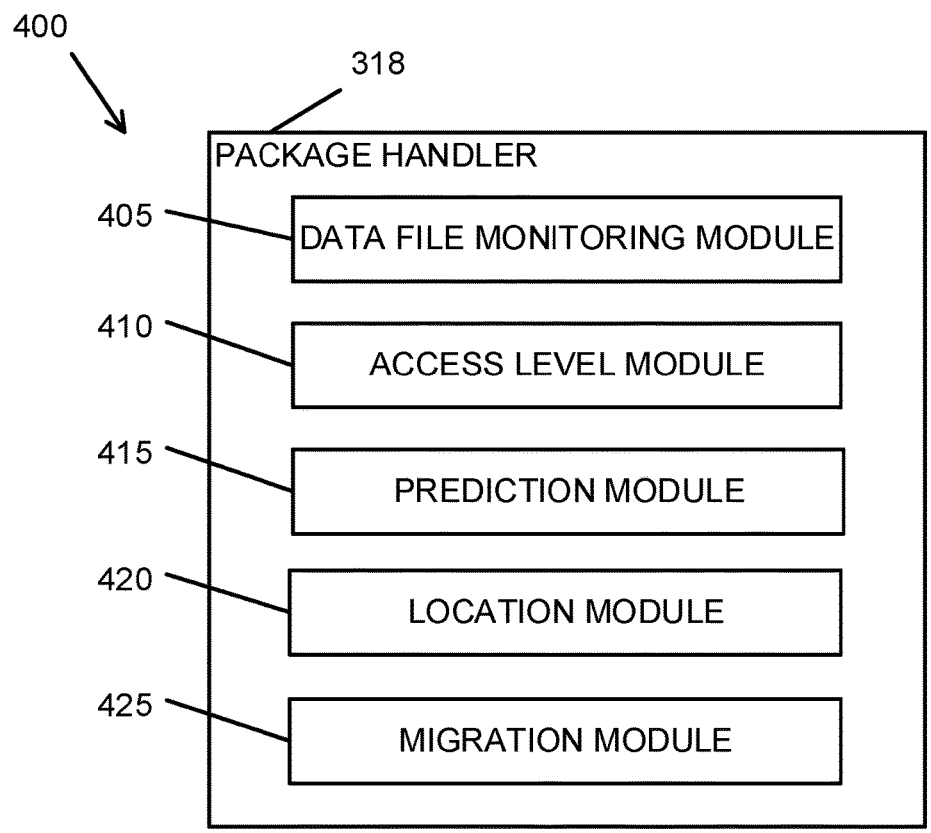
FIG. 4 depicts a schematic diagram outlining a portion of a computer system.

Referring to FIG. 4, system 400 includes a portion of a computer system outlining the components of package handler 318. In various embodiments, package handler 318 includes a data file monitoring module 405, an access level module 410, a prediction module 415, a location module 420, and a migration module 425. Although the package handler 318 is depicted herein with certain elements and implementations, the package handler 318 is not limited to these elements and implementations. In various embodiments, the data file monitoring module 405 identifies one or more data files in external storage. In an embodiment, the access level module 410 sorts the one or more data files into different access levels. In various embodiments, the prediction module 415 predicts the sorted one or more data files that will be accessed on the mobile device using a prediction engine, where the prediction module 415 includes the prediction engine. In various embodiments, the location module 420 locates, in response to the predicting, the predicted one or more data files in the external storage. In various embodiments, the migration module 425 migrates, or recalls, the predicted one or more data files from the external storage to the mobile device.

In an embodiment, the package handler 318 may further include a high priority file module. In various embodiments, the high priority file module determines high priority files for each of the access levels, where the high priority files are highest priority files selected from the one or more data files sorted into access levels. In various embodiments, the prediction module 415 also predicts the high priority files that will be accessed on the mobile device using the prediction engine. The migration module 425 may also migrate the predicted high priority files from the external storage to the mobile device.

In various embodiments, the high priority files include global high priority files and access level high priority files. In various embodiments, when the migration module 425 migrates the predicted one or more data files, the migration module 425 also migrates the global high priority files from external storage to the mobile device, and migrates the access level high priority files from the external storage to the mobile device.

Figure 5:
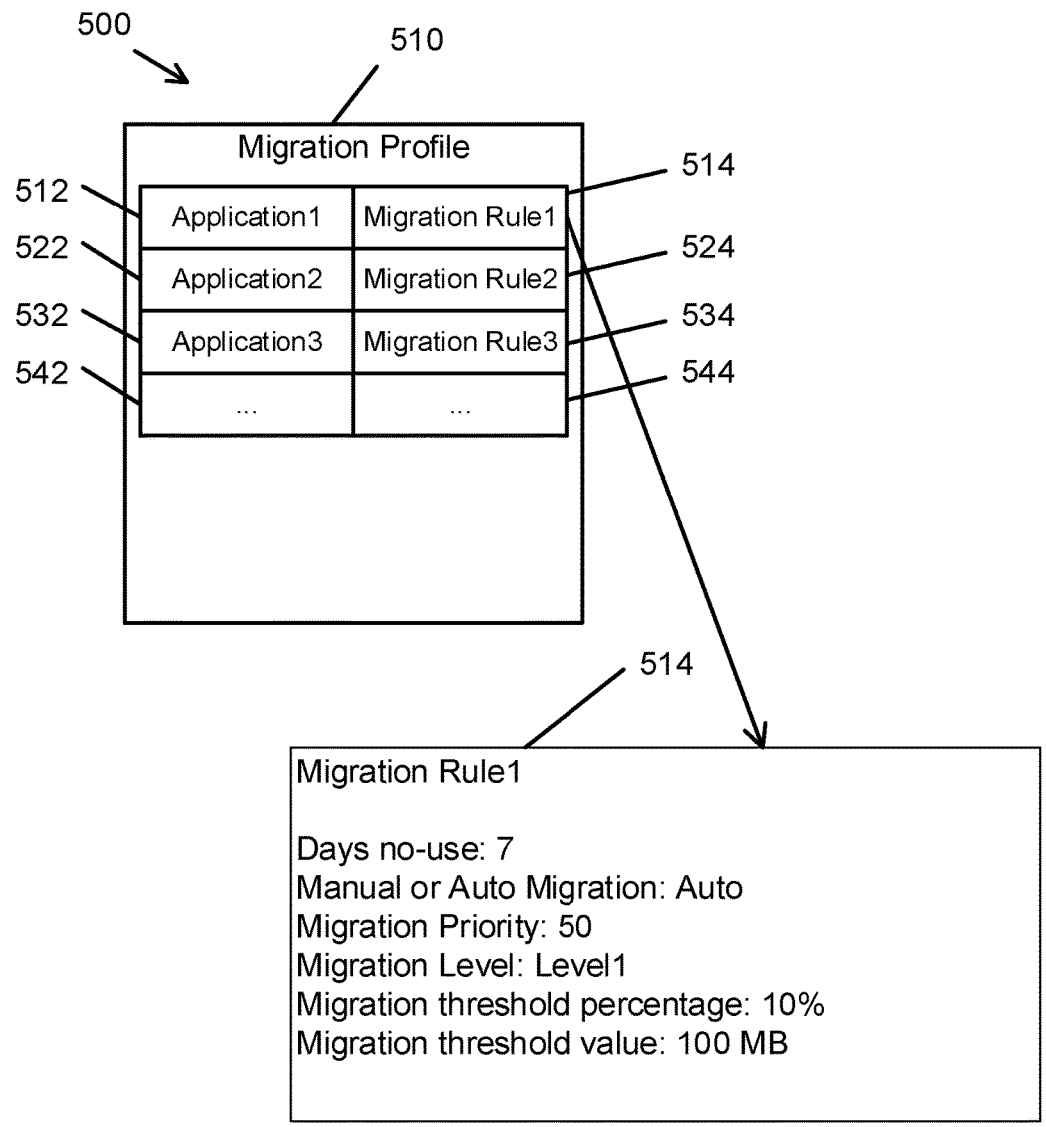
FIG. 5 depicts a schematic diagram outlining a portion of a computer system.

Referring to FIG. 5, a system 500 outlining a migration profile 510, is depicted, according to various embodiments. Although the migration profile 510 is depicted herein with certain elements and implementations, the migration profile 510 is not limited to these elements and implementations. In various embodiments, the application controller (depicted in FIG. 3) maintains a migration profile for each application. In the migration profile 510 each application 512, 522, 532, 542 has a corresponding migration rule 514, 524, 534, 544. The migration rule 514, 524, 534, 544 defines the migration attributes of the corresponding application 512, 522, 532, 542. FIG. 5 depicts a migration rule 1 514 corresponding to an application 1 512 in migration profile 510.

In various embodiments, the migration rule 514, 524, 534, 544 includes at least days no-use, manual or automatic migration, migration priority, migration level, migration threshold percentage value, and migration threshold value. In various embodiments, the migration rule 514, 524, 534, 544 includes either a threshold percentage value or a threshold value. In various embodiments, days no-use is the number of days the application has not been used. In various embodiments, manual or auto migration is whether data migration is controlled manually (by a user of a mobile device) or automatically (by a migration daemon in a computer system). In various embodiments, migration priority is the application's 512, 522, 532, 542, and its corresponding data's, migration priority. In various embodiments, migration level is the application's migration level, which indicates which level of its data files are about to be migrated. In various embodiments, a migration rule includes more than one migration level. In various embodiments, migration threshold percentage value is the threshold percentage value for the corresponding application 512, 522, 532, 542. In various embodiments, migration threshold value is the threshold value for the corresponding application 512, 522, 532, 542.

Figure 6:
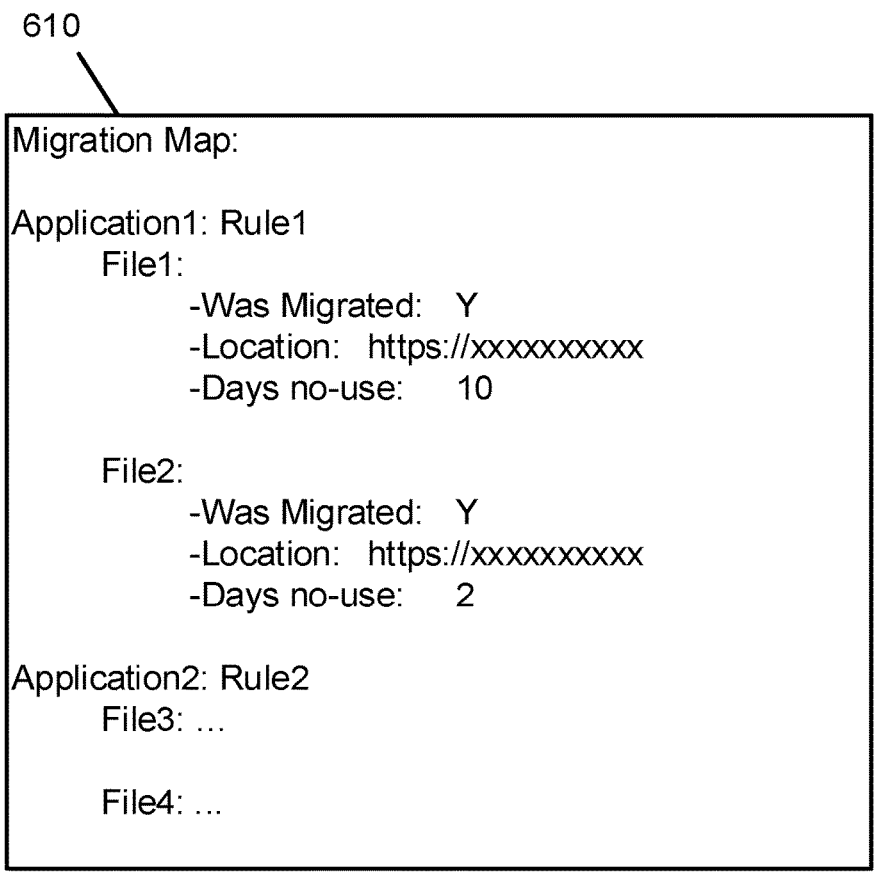
FIG. 6 depicts a schematic diagram outlining a portion of a computer system.

Referring to FIG. 6, an outline of a migration map 610 is depicted, according to various embodiments. In various embodiments, after data for one or more applications has been migrated to external storage, the package handler (FIG. 3) will generate a migration map 610 for the data which was migrated. The package handler may also send the migration to map 610 to the corresponding application and save the migration map 610 in a package location database within the package handler. In various embodiments, each application maintains its own migration map 610. As depicted in FIG. 6, a migration map 610 may contain mapping data of each migrated file. In various embodiments, mapping data includes a migration flag identifying if the data file has been migrated, a location of the data file, and days no-use identifying the number of days the file has not been used.

Figure 7:
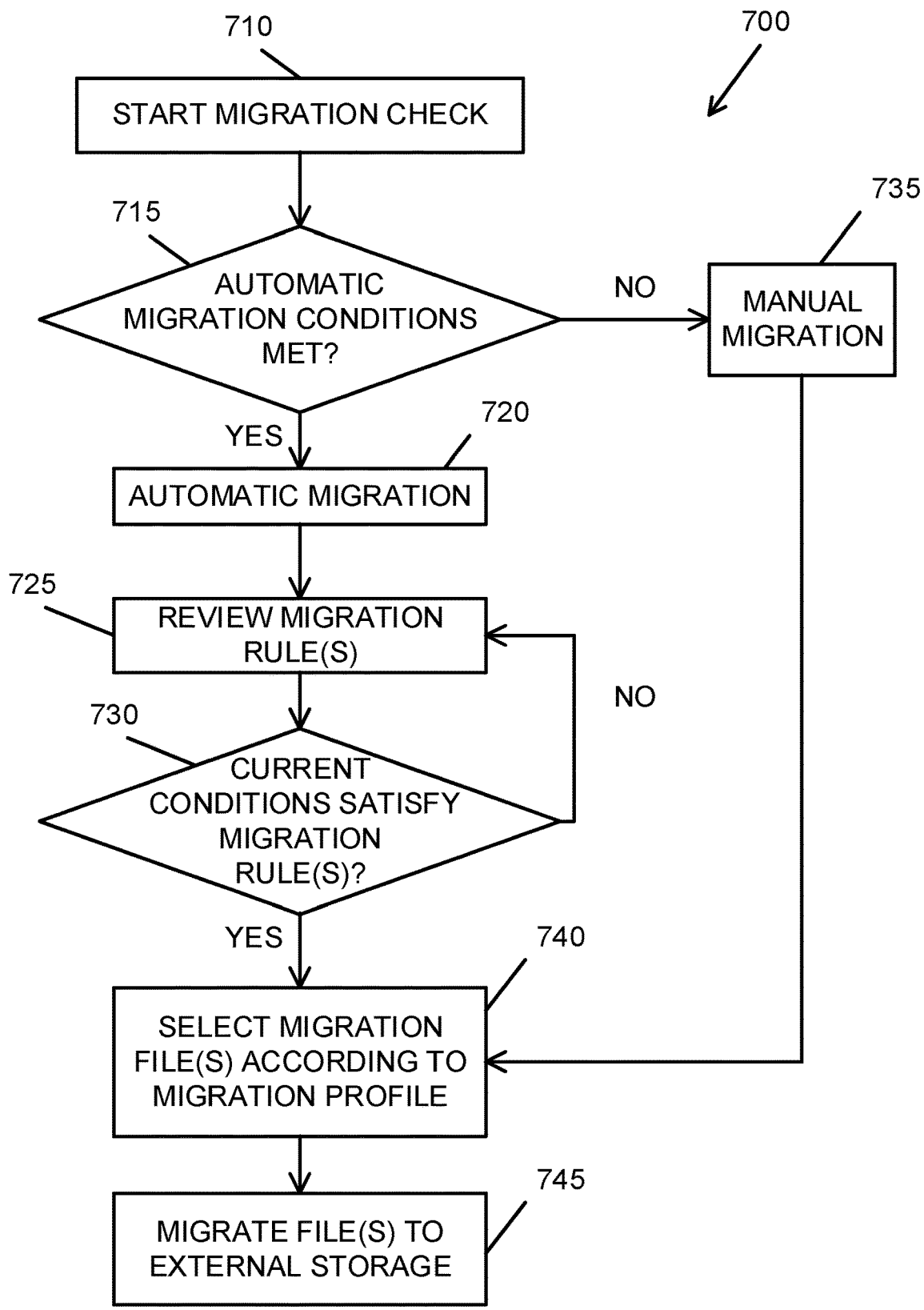
FIG. 7 presents a flowchart, according to various embodiments.

Referring to FIG. 7, a flowchart outlining a method 700 of migrating data files to external storage is depicted, according to various embodiments. In an embodiment, the method 700 is implemented as a computer script or computer program to be executed on a computer system such as computer system 300. The method 700 is only one example of migrating data files to external storage.

In an embodiment, a computer system is configured to execute operation 710 to start a migration check. In various embodiments, a migration check is conducted to ensure that migration rules and various conditions are met before migrating the data. In an embodiment, a computer system is configured to execute operation 715 to determine if automatic migration conditions are met. In various embodiments, automatic migration conditions determine whether data is able to be migrated automatically. In various embodiments, automatic migration conditions include WIFI network connection and a migration time window, where a migration time window is a time range that it is acceptable to migrate data.

In operation 720, the automatic migration conditions are met, therefore the migration will be an automatic migration. In operation 725, once it is determined that the migration will be an automatic migration, the migration rule(s) are reviewed. Reviewing the migration rules determines whether the data is eligible for migration, when the migration is instigated by a computer system. In operation 730, it is determined whether the current conditions of the data satisfy the migration rule(s). When the current conditions do not satisfy the migration rule(s) the migration rules are again reviewed, as shown in operation 725. When the current conditions satisfy the migration rule(s), the method 700 may proceed to operation 740.

In operation 735, the automatic migration conditions are not met, therefore it is determined that the migration will be a manual migration. In various embodiments, a manual migration is instigated by a user of a mobile device. Once it is determined that there will be a manual migration, the method 700 may proceed to operation 740.

In operation 740, migration files (data files) are selected according to the corresponding migration profiles. As discussed herein, migration profiles contain migration rules for various applications. The migration profile outlines which data files are best suited for migration. In various embodiments, when the migration is manual migration, a user may override the migration profile and data files may be migrated to external storage.

In operation 745, the migration files selected in operation 740 is migrated to external storage. In various embodiments, the migration is a manual migration. In various embodiments, the migration is an automatic migration. In various embodiments, operation 745 corresponds with operation 160 of FIG. 1.

Figure 8:
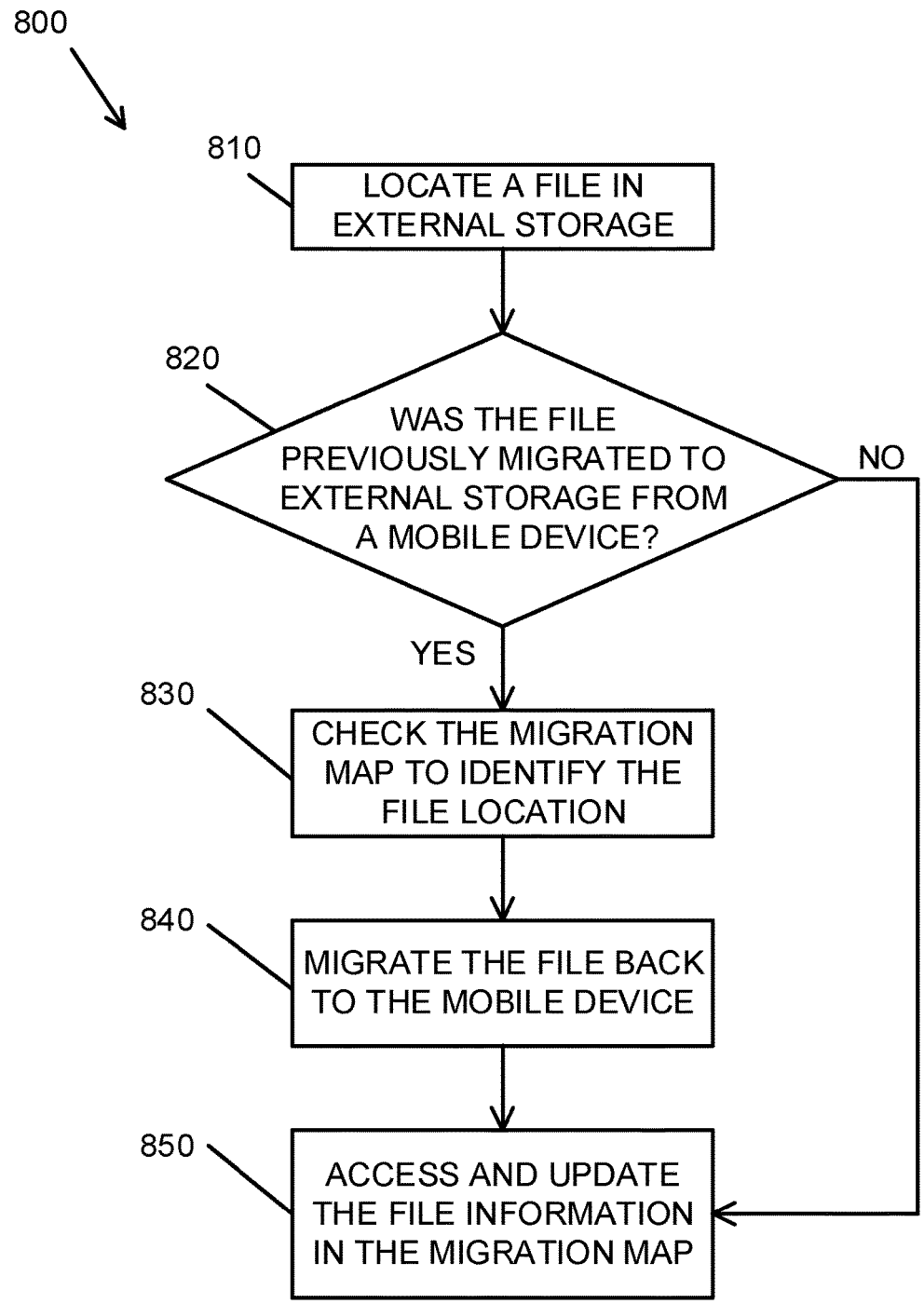
FIG. 8 presents a flowchart, according to various embodiments.

Referring to FIG. 8, a flowchart outlining a method 800 of migrating, or recalling, data files back to a mobile device is depicted, according to various embodiments. In an embodiment, the method 800 is implemented as a computer script or computer program to be executed on a computer system such as computer system 300. The method 800 is only one example of recalling data files to a mobile device.

In an embodiment, a computer system is configured to execute operation 810 to start locating a file in external storage. In various embodiments, operation 810 corresponds with operation 245 in FIG. 2. In various embodiments, locating a file in external storage is done using the migration map 610.

In operation 820, once the file (data file) is located in external storage, it is determined whether the file had been previously migrated to external storage from a mobile device. In various embodiments, the package handler 318 is used to determine whether the file had been previously migrated. In various embodiments, it is determined that the file was not previously migrated to external storage from a mobile device, and the method 800 may proceed to operation 850. In various embodiments, it is determined that the file was previously migrated to external storage from a mobile device. Once this has been determined, the method may proceed to operation 830.

In operation 830, the migration map is checked, by the package handler 318, to identify the file location. In various embodiments, identifying the file location includes identifying the migration location of the data file on the mobile device. In operation 840, after the file location has been identified, the file is migrated, or recalled, back to the mobile device. In various embodiments, operation 840 corresponds with operation 255 in FIG. 2.

In operation 840, the file information in the migration map is accessed and updated with the current location of the data file. In various embodiments, the accessing and updating is done by the package handler 318.

Figure 9:
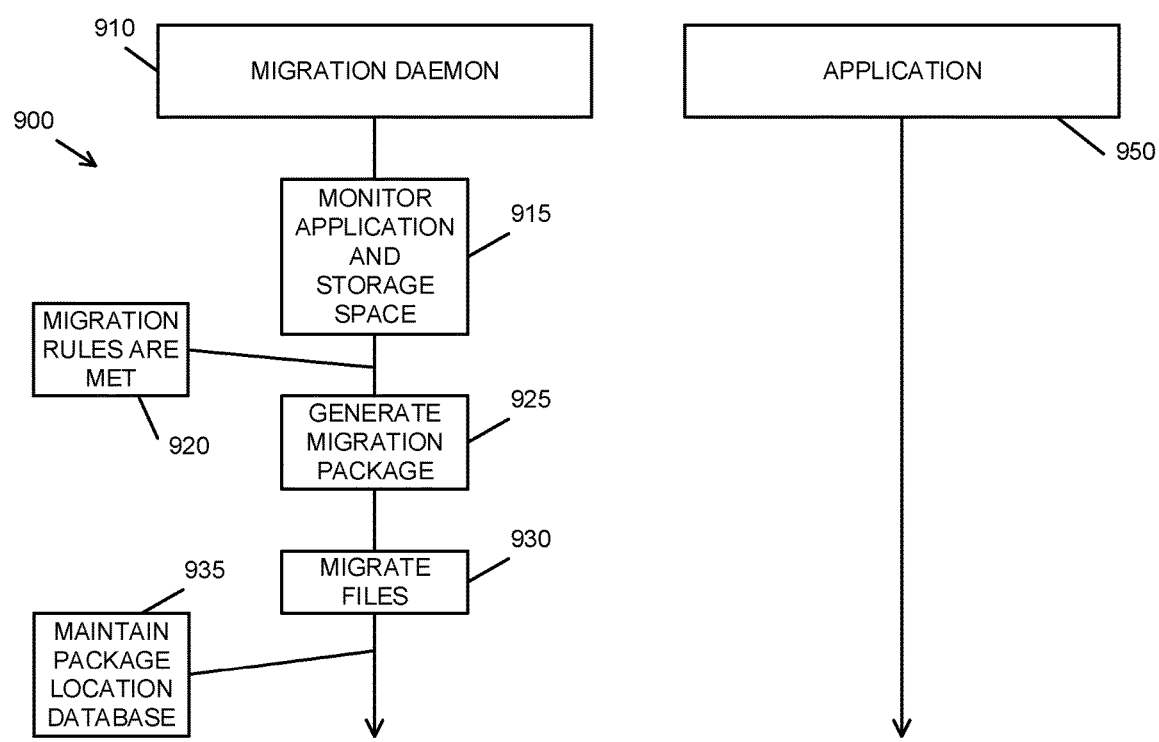
FIG. 9 depicts a schematic diagram outlining interactions in a computer environment, according to various embodiments.

Referring to FIG. 9, a schematic diagram 900 is depicted outlining the interaction between a migration daemon 910 and an application 950 when an application 950 does not support automatic migration, according to various embodiments. In various embodiments, in order to work with migration daemon 910 and to support automatic migration, the application 950 implements a migration interface. In various embodiments, when application 950 implements the migration interface, application 950 then supports automatic migration. In various embodiments, application 950 did not implement the migration interface, therefore application 950 does not support automatic migration. In various embodiments, migration daemon 910 corresponds with migration daemon 310 in FIG. 3. In various embodiments, application 950 corresponds with mobile application(s) 350 in FIG. 3.

In various embodiments, when application 950 does not support automatic migration, all responsibilities and tasks fall to the migration daemon 910. In operation 915, the migration daemon 910 monitors the application and storage space. In operation 920, it is determined that the migration rules are met by the current conditions of the data. In various embodiments, operation 920 corresponds with operations 720 and 725 in FIG. 7. In operation 925, once the migration rules are met, a migration package is generated. In various embodiments a migration package includes the data files about to be migrated. In operation 930, the data files or migration package are migrated to external storage. In operation 935, once the data files are migrated to external storage, the package location database, in the package handler, is maintained. In various embodiments, maintaining the package location database includes updating the migration map for the corresponding application and data files with the current location of the data files. In various embodiments, when applications do not support automatic migration, the operations happen only on the migration daemon 910 and are transparent (not visible) to the application 950.

Figure 10:
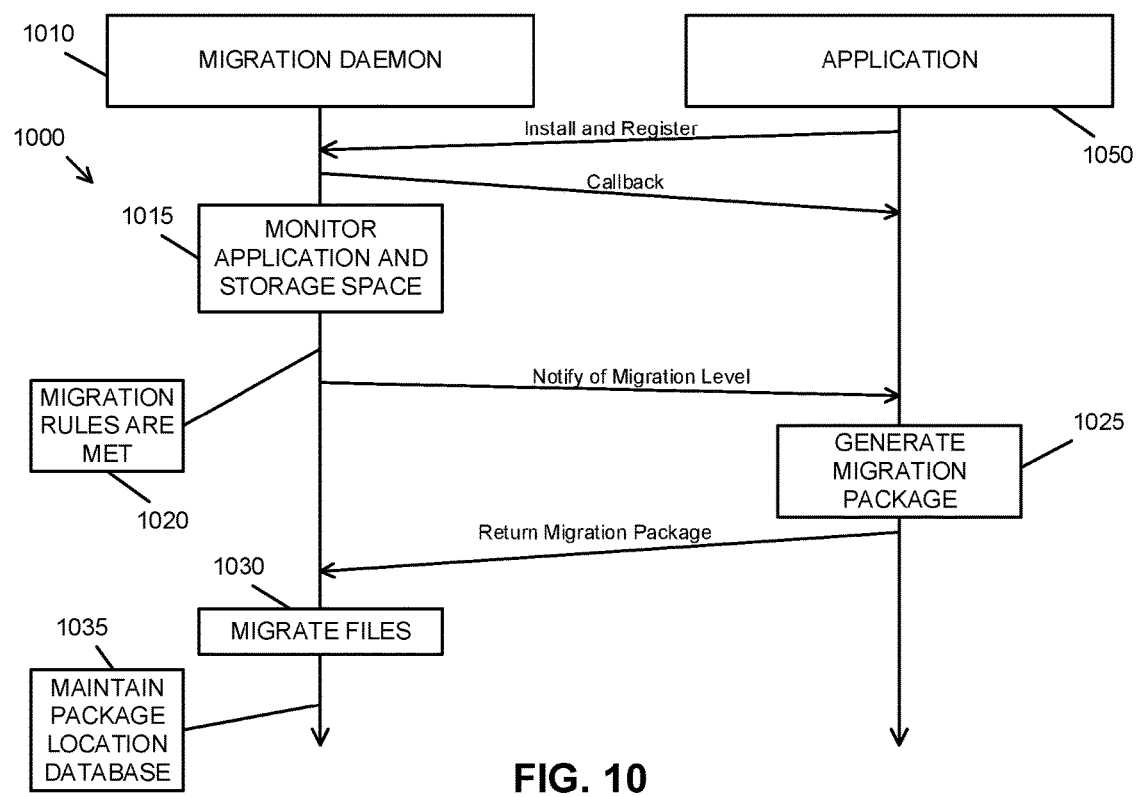
FIG. 10 depicts a schematic diagram outlining interactions in a computer environment, according to various embodiments.

Referring to FIG. 10, a schematic diagram 1000 is depicted outlining the interaction between a migration daemon 1010 and an application 1050 when application 1050 does support automatic migration, according to various embodiments. In various embodiments, migration daemon 1010 corresponds with migration daemon 310 in FIG. 3. In various embodiments, application 1050 corresponds with mobile application(s) 350 depicted in FIG. 3.

In various embodiments, when application 1050 supports automatic migration, responsibilities and tasks are split between the migration daemon 1010 and the application 1050. When application 1050 is first installed on a mobile device, the application is installed and then registered with the migration daemon 1010. Data is then returned to the application 1050. In operation 1015, once application 1050 is registered with the migration daemon 1010, the application and storage space are monitored by the migration daemon 1010. In operation 1020, it is determined that the migration rules are met by the current conditions of the data. In various embodiments, the migration daemon 1010 will notify the application 1050 of its migration level. In operation 1025, the application 1050 will then generate a migration package. In various embodiments, the migration package includes the data files to be migrated. The data files (migration package) may then be returned to the migration daemon 1010. In operation 1030, the data files are migrated to external storage. In operation 1035, one the data files are migrated, the migration daemon maintains the package location database in the package handler. In various embodiments, when applications support automatic migration, operations occur on both the migration daemon 1010 and the application 1050, and communication is continuous between the migration daemon 1010 and the application 1050.

Figure 11:
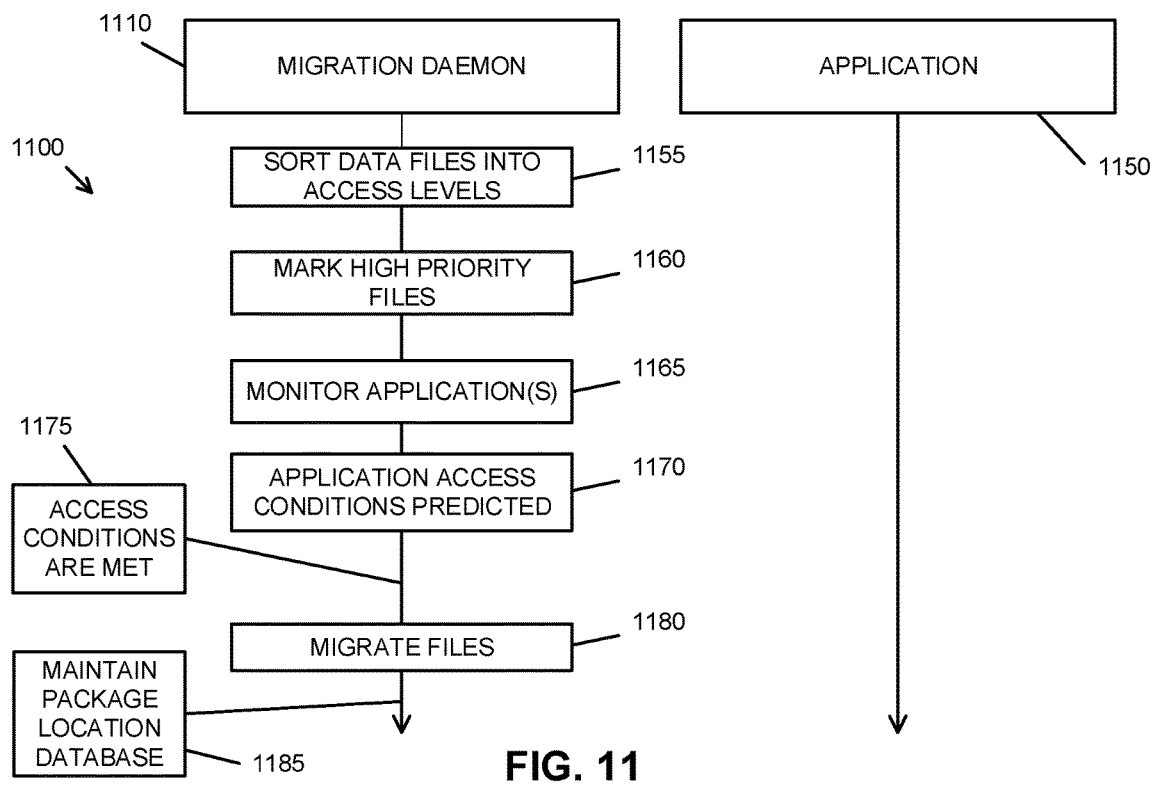
FIG. 11 depicts a schematic diagram outlining interactions in a computer environment, according to various embodiments.

Referring to FIG. 11, a schematic diagram 1100 is depicted outlining the interaction between a migration daemon 1110 and an application 1150 when application 1150 does not support pre-fetch recall, according to various embodiments. In various embodiments, application 1150 did not implement the migration interface, therefore application 1150 does not support pre-fetch recall. In various embodiments, migration daemon 1110 corresponds with migration daemon 310 in FIG. 3. In various embodiments, application 1150 corresponds with mobile application(s) 350 depicted in FIG. 3.

In various embodiments, when application 1150 does not support pre-fetch recall, all responsibilities and tasks fall to the migration daemon 1110. In operation 1155, the migration daemon sorts data files into access levels. In operation 1160, once the data files are sorted, the high priority files are marked. In operation 1165, the applications are monitored to predict which data files and applications will be accessed on a mobile device. In operation 1170, the application data access conditions are predicted. In various embodiments, access conditions include a time or circumstance when a user is most likely to access the application data. In operation 1175 it is determined that access conditions are met and in operation 1180, the files are migrated, or recalled, to a mobile device. In various embodiments, access conditions may include migration rules corresponding to the data files. In operation 1185, the migration package location database is maintained by the migration daemon 1110. In various embodiments, when applications do not support pre-fetch recall, the operations happen only one the migration daemon 1110 and are transparent to the application 1150.

Figure 12:
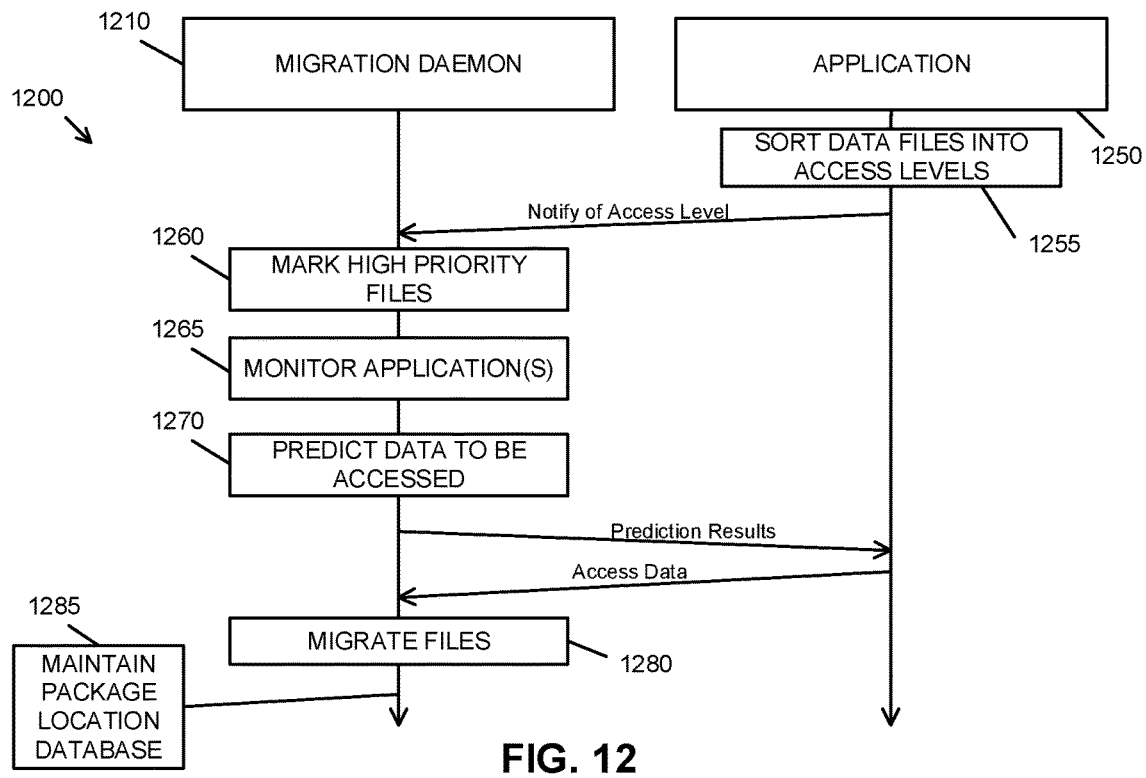
FIG. 12 depicts a schematic diagram outlining interactions in a computer environment, according to various embodiments.

Referring to FIG. 12, a schematic diagram 1200 is depicted outlining the interaction between a migration daemon 1210 and an application 1250 when application 1250 does support pre-fetch recall, according to various embodiments. In various embodiments, application 1250 implemented a migration interface, therefore application 1250 supports pre-fetch recall. In various embodiments, migration daemon 1210 corresponds with migration daemon 310 in FIG. 3. In various embodiments, application 1250 corresponds with mobile application(s) 350 in FIG. 3.

In various embodiments, when application 1250 supports pre-fetch recall, responsibilities and tasks are split between the migration daemon 1210 and the application 1250. In operation 1255, the application 1250 sorts data files into access levels. The application 1250 may then notify the migration daemon 1210 of the sorted access levels. In operation 1260, the migration daemon 1210 then marks high priority files. In operation 1265, the applications are monitored to predict which data files and applications will be accessed on a mobile device. In operation 1270 it is predicted which application data is most likely to be accessed using the prediction engine. In various embodiments, the prediction engine determines an order of access for the data. The migration daemon 1210 and the application 1250 may exchange results and data. In operation 1280, the predicted data files are migrated back to the mobile device. In operation 1285, the migration package location database is maintained by the migration daemon 1210. In various embodiments, when applications support pre-fetch recall, operations occur on both the migration daemon 1210 and the application 1250, and communication is continuous between the migration daemon 1210 and the application 1250.

Figure 13:
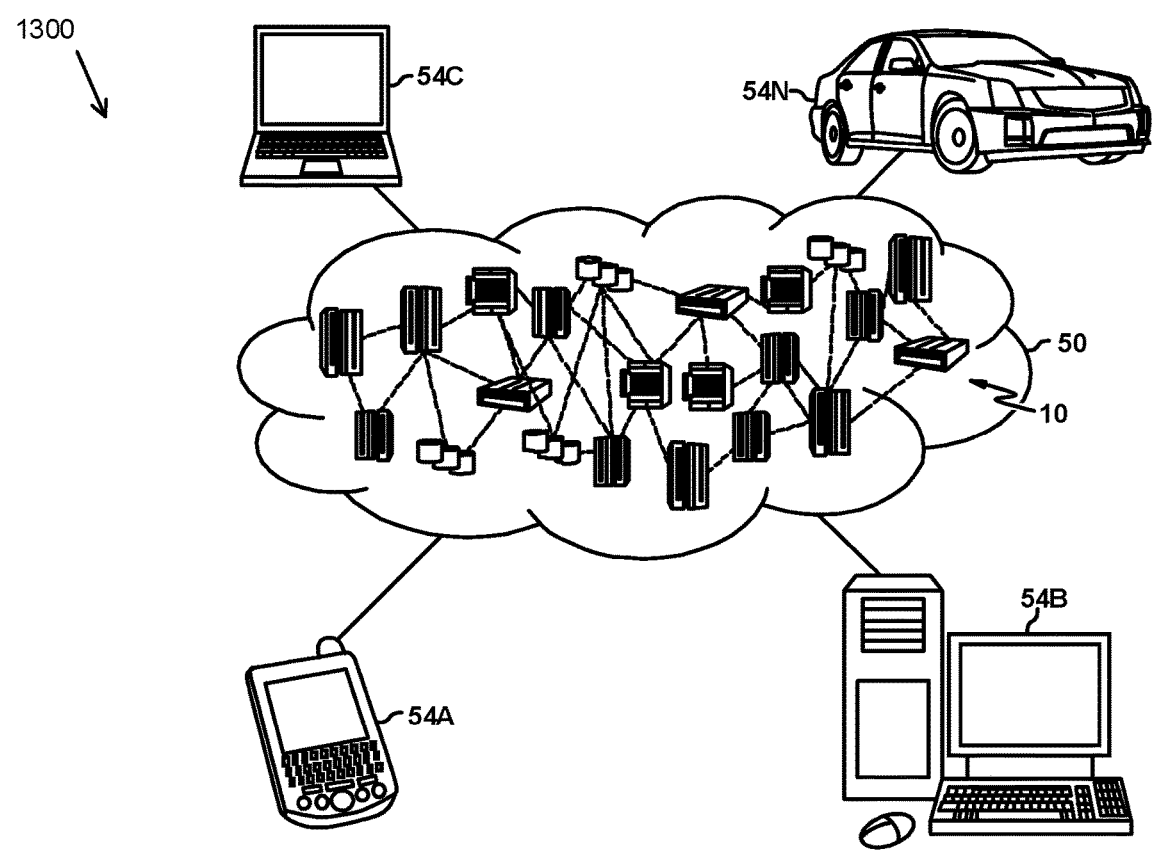
FIG. 13 depicts a cloud computing environment, according to various embodiments.

Referring now to FIG. 13, illustrative cloud computing environment 1300 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
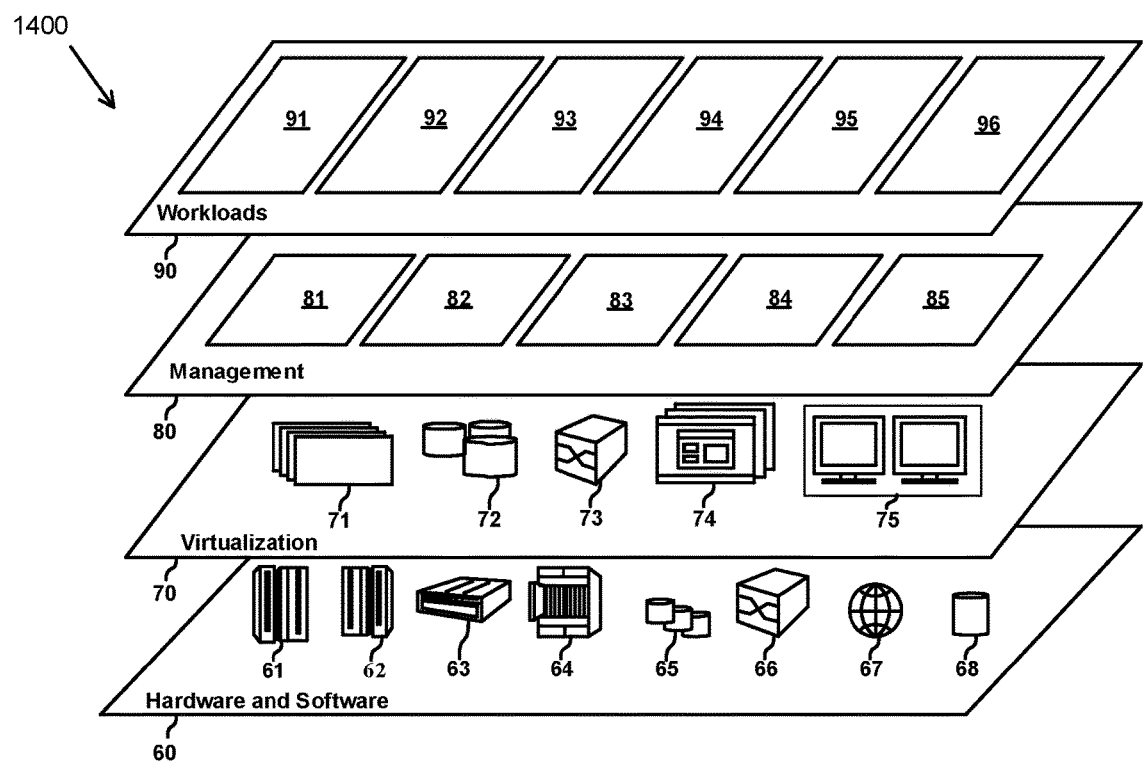
FIG. 14 depicts abstraction model layers, according to various embodiments.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data migration processing 96.

Figure 15:
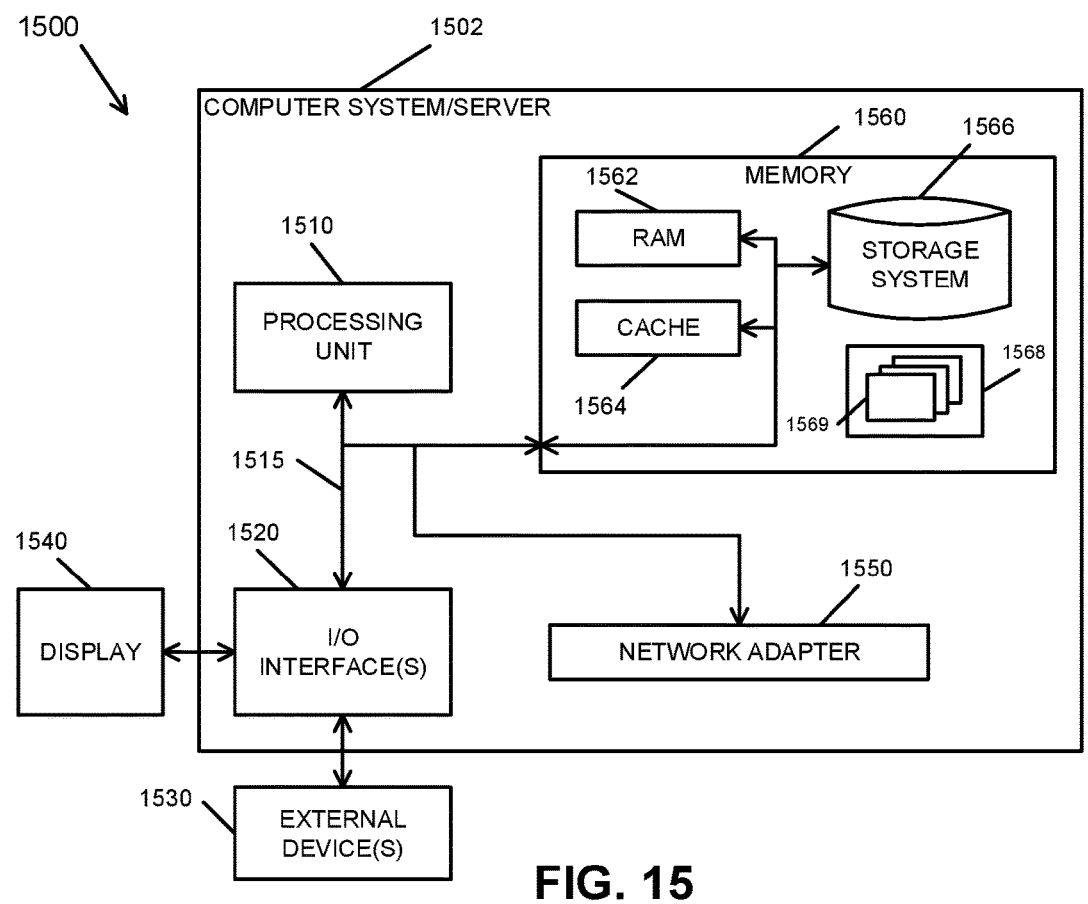
FIG. 15 depicts a sample computer system, according to various embodiments.

FIG. 15 shows an exemplary embodiment of a computer system, computer system 1500. Computer system 1500 is only one example of a computer system and is not intended to suggest any limitation as to the scope of use or functionality of embodiments of the present invention. Regardless, computer system 1500 is capable of being implemented to perform and/or performing any of the functionality/operations of the present invention.

Computer system 1500 includes a computer system/server 1502, which is operational with numerous other general purpose or special purpose computing system environments or configurations. Examples of well-known computing systems, environments, and/or configurations that may be suitable for use with computer system/server 1502 include, but are not limited to, personal computer systems, server computer systems, thin clients, thick clients, handheld or laptop devices (including mobile devices), multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 1502 in computer system 1500 is shown in the form of a general-purpose computing device. The components of computer system/server 1502 may include, but are not limited to, one or more processors or processing units 1510, a system memory 1560, and a bus 1515 that couple various system components including system memory 1560 to processor 1510.

Bus 1515 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1502 typically includes a variety of computer system readable media. Such media may be any available media that is accessible by computer system/server 1502, and it includes both volatile and non-volatile media, removable and non-removable media.

System memory 1560 can include computer system readable media in the form of volatile memory, such as random access memory (RAM) 1562 and/or cache memory 1564. Computer system/server 1502 may further include other removable/non-removable, volatile/non-volatile computer system storage media. By way of example only, storage system 1566 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1515 by one or more data media interfaces. As will be further depicted and described below, memory 1560 may include at least one program product having a set (e.g., at least one) of program modules that are configured to carry out the functions of embodiments of the invention.

Program/utility 1568, having a set (at least one) of program modules 1569, may be stored in memory 1560 by way of example, and not limitation, as well as an operating system, one or more application programs, other program modules, and program data. Each of the operating system, one or more application programs, other program modules, and program data or some combination thereof, may include an implementation of a networking environment. Program modules 1569 generally carry out the functions and/or methodologies of embodiments of the invention as described herein.

Computer system/server 1502 may also communicate with one or more external devices 1530 such as a keyboard, a pointing device, a display 1540, etc.; one or more devices that enable a user to interact with computer system/server 1502; and/or any devices (e.g., network card, modem, etc.) that enable computer system/server 1502 to communicate with one or more other computing devices. Such communication can occur via Input/Output (I/O) interfaces 1520. Still yet, computer system/server 1502 can communicate with one or more networks such as a local area network (LAN), a general wide area network (WAN), and/or a public network (e.g., the Internet) via network adapter 1550. As depicted, network adapter 1550 communicates with the other components of computer system/server 1502 via bus 1515. It should be understood that although not shown, other hardware and/or software components could be used in conjunction with computer system/server 1502. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   identifying one or more computer software applications (applications) on a mobile device;
   generating one or more migration profiles for the one or more applications, wherein each of the one or more applications corresponds (corresponding application) to a migration profile among the one or more migration profiles and wherein the migration profile includes data about the corresponding application;
   monitoring storage space of the one or more applications on the mobile device, wherein the monitoring comprises identifying data files of to the one or more applications;
   calculating an amount of storage space to determine whether there is a shortage of the storage space on the mobile device for the data files of the one or more applications;
   in response to calculating that there is the shortage of the storage space, determining when the data files of the one or more applications are configured to be migrated; and
   in response to determining when the data files of the one or more applications are configured to be migrated, migrating the data files of the one or more applications to external storage.

2. The method of claim 1, wherein each of the one or more migration profiles includes a migration rule, wherein the migration rule includes data describing one or more conditions under which the data files of the one or more applications are able to be migrated.

3. The method of claim 2, wherein migrating the data files of the one or more applications to the external storage is an automatic migration.

4. The method of claim 3, further comprising:
   monitoring the one or more applications for satisfaction of the conditions of the migration rule;
   determining whether the one or more applications satisfies the migration rule; and
   in response to determining that the one or more applications satisfies the migration rule, automatically migrating the data files of the one or more applications to the external storage.

5. The method of claim 1, wherein only a portion of the data files of the one or more applications is migrated.

6. The method of claim 5, wherein each of the one or more migration profiles includes a migration level, wherein the migration level includes data to be used to identify the portion of the data files to migrate to the external storage.

7. The method of claim 6, wherein the migration level is determined by the corresponding application.

8. The method of claim 1, wherein calculating the amount of storage space to determine whether there is the shortage of storage space comprises:
   accessing a threshold value for each of the one or more applications, wherein the threshold value is included in the migration profile and wherein the threshold value is a designated amount of the storage space for the corresponding application;
   calculating, based on the monitoring of the storage space of the one or more applications, an engaged value for each of the one or more applications, wherein the engaged value is an amount of the storage space currently being used by the corresponding application; and
   comparing the engaged value with the threshold value for each of the one or more applications to determine whether there is the shortage of the storage space.

9. The method of claim 8, further comprising:
determining that the engaged value is greater than the threshold value, indicating that there is the shortage of the storage space; and
transmitting a storage shortage alert to trigger the migration of the data files of the one or more applications to the external storage.

10. The method of claim 1, wherein calculating the amount of storage space to determine whether there is the shortage of the storage space comprises:
accessing a threshold percentage value for each of the one or more applications, wherein the threshold percentage value is included in the migration profile and wherein the threshold percentage value indicates a designated percentage of the storage space for the corresponding application;
calculating, based on the monitoring of the storage space of the one or more applications, an engaged percentage value for each of the one or more applications, wherein the engaged percentage value indicates a percentage of the storage space currently being used by the corresponding application; and
comparing the engaged percentage value with the threshold percentage value for each of the one or more applications to determine whether there is the shortage of the storage space.

11. The method of claim 1, wherein migrating the data files of the one or more applications to the external storage includes migrating the data files from the mobile device to cloud storage.

12. A system comprising:
one or more computer processors comprising a migration daemon for managing one or more applications on a mobile device, the migration daemon comprising
an application controller to identify one or more computer software applications (applications) on a mobile device,
the application controller to generate one or more migration profiles for the one or more applications, wherein each of the one or more applications corresponds (corresponding application) to a migration profile among the one or more migration profiles and wherein the migration profile includes data about the corresponding application,
a device storage monitor to monitor storage space of the one or more applications on the mobile device, wherein the monitoring comprises identifying data files of the one or more applications,
the device storage monitor to calculate an amount of storage space to determine whether there is a shortage of the storage space on the mobile device for the data files of the one or more applications,
a trigger agent to, in response to calculating that there is the shortage of storage space, determine when the data files of the one or more applications are configured to be migrated, and
a package handler to, in response to determining when the data files of the one or more applications are configured to be migrated, migrate the data files of the one or more applications to external storage.

13. The system of claim 12, wherein the package handler migrates the data files of the one or more applications to the external storage as an automatic migration.

14. The system of claim 12, wherein only a portion of the data files of the one or more applications is migrated.

15. The system of claim 12, wherein the device storage monitor
accesses a threshold value for each of the one or more applications, wherein the threshold value is included in the migration profile and wherein the threshold value is a designated amount of the storage space for the corresponding application,
calculates, based on the monitoring of the storage space of the one or more applications, an engaged value for each of the one or more applications, wherein the engaged value is an amount of the storage space currently being used by the corresponding application, and
compares the engaged value with the threshold value for each of the one or more applications to determine whether there is the shortage of the storage space.

16. The system of claim 12, wherein the device storage monitor
accesses a threshold percentage value for each of the one or more applications, wherein the threshold percentage value is included in the migration profile and wherein the threshold percentage value indicates a designated percentage of the storage space for the corresponding application,
calculates, based on the monitoring of the storage space of the one or more applications, an engaged percentage value for each of the one or more applications, wherein the engaged percentage value indicates a percentage of the storage space currently being used by the corresponding application, and
compares the engaged percentage value with the threshold percentage value for each of the one or more applications to determine whether there is the shortage of the storage space.

17. A computer program product comprising a computer readable storage medium having program instructions embodied therewith, the program instructions executable by a processor to cause the processor to perform a method comprising:
identifying one or more computer software applications (applications) on a mobile device;
generating one or more migration profiles for the one or more applications, wherein each of the one or more applications corresponds (corresponding application) to a migration profile among the one or more migration profiles and wherein the migration profile includes data about the corresponding application;
monitoring storage space of the one or more applications on the mobile device, wherein the monitoring comprises identifying data files of the one or more applications;
calculating an amount of storage space to determine whether there is a shortage of the storage space on the mobile device for the data files of the one or more applications;
in response to calculating that there is the shortage of the storage space, determining when the data files of the one or more applications are configured to be migrated; and
in response to determining when the data files of the one or more applications are configured to be migrated, migrating the data files of the one or more applications to external storage.

18. The computer program product of claim 17, wherein each of the one or more migration profiles includes a migration rule, wherein the migration rule includes data describing one or more conditions under which the data files of the one or more applications is able to be migrated.

19. The computer program product of claim 18, wherein migrating the data files of the one or more applications to the external storage is an automatic migration.

20. The computer program product of claim 19, wherein the method further comprises:
- monitoring the one or more applications for satisfaction of the conditions of the migration rule;
- determining whether the one or more applications satisfies the migration rule; and
- in response to determining that the one or more applications satisfies the migration rule, automatically migrate the data files of the one or more applications to the external storage.

* * * * *